US006419190B1

(12) United States Patent
Nguegang

(10) Patent No.: US 6,419,190 B1
(45) Date of Patent: Jul. 16, 2002

(54) AIRBORNE CLEANING AND PAINTING ROBOT

(76) Inventor: Gino Francis Nguegang, 1608 O'Neil Cir., Rochester Hills, MI (US) 48307

( * ) Notice: Subject to any disclaimer, the term of this patent is extended or adjusted under 35 U.S.C. 154(b) by 0 days.

(21) Appl. No.: 09/684,382

(22) Filed: Oct. 10, 2000

(51) Int. Cl.[7] .................................................. B64D 1/00

(52) U.S. Cl. .................. 244/136; 244/17.23; 244/23 R; 244/23 B; 118/256; 118/323; 401/137; 401/191

(58) Field of Search ............................ 244/17.23, 23 R, 244/136, 137.1, 23 B; 118/323, 256; 401/191, 137

(56) References Cited

U.S. PATENT DOCUMENTS 4,664,340 A * 5/1987 Jackson ...................... 244/136
4,795,111 A * 1/1989 Moller ..................... 244/23 C
5,069,400 A * 12/1991 Kovaletz .................... 244/136
5,248,341 A * 9/1993 Berry Jr, et al. ............ 118/698

* cited by examiner

*Primary Examiner*—J. Woodrow Eldred

(57) ABSTRACT

A Cleaning and Painting Robot having the capability to fly, and a cleaning or painting mechanism that can be located at various positions on the robot body. The robot comprises of a flying unit connected with a feeding tube to a ground-moving base that holds the pressurized cleaning solution or paint. A steering mechanism in contact with the surface being cleaned or painted for changing the direction of advance of the flying unit while the back propeller or main rotors pushes the flying body against the working surface. An array of sensors is mounted of the flying unit body to get the physical size of the working surface, avoid obstacles, maintain stability and control others critical characteristics.

6 Claims, 7 Drawing Sheets

FLYING UNIT WITH ROLLER PAINT MECHANISM

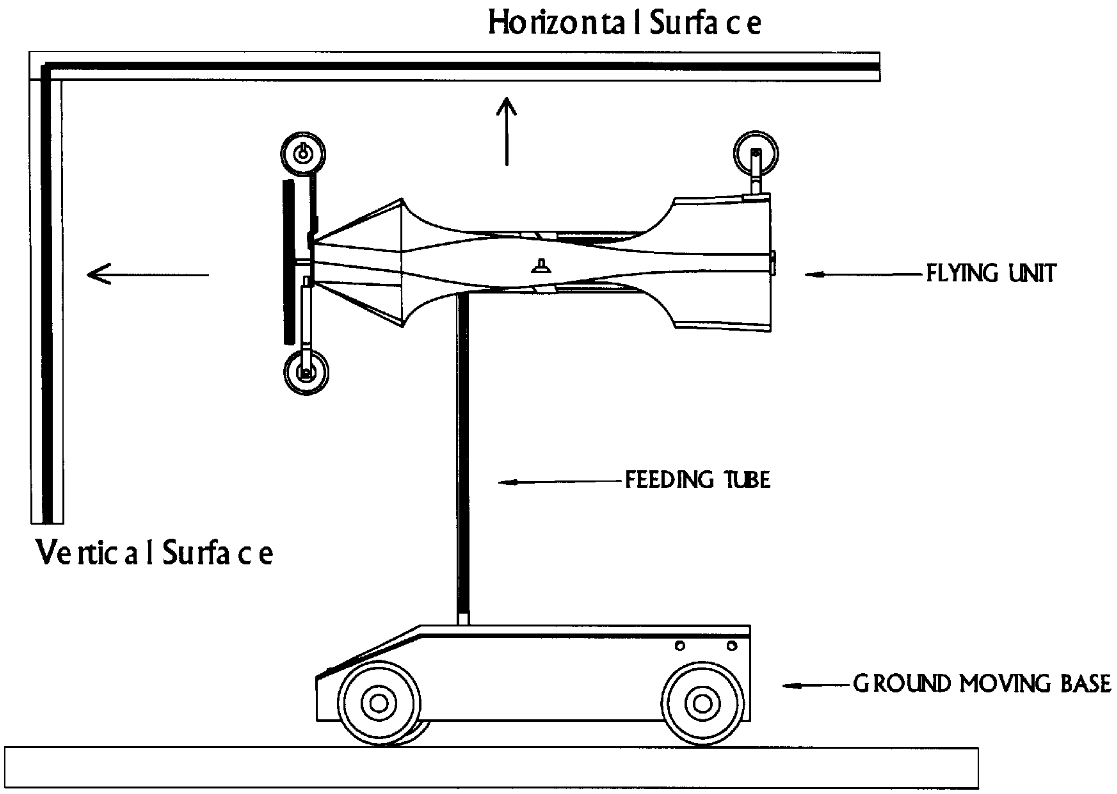
FIG. 1 Robot Configuration
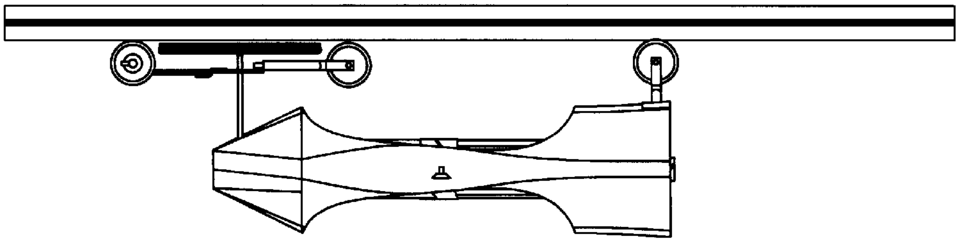
FIG. 2 Flying unit in the horizontal work area configuration

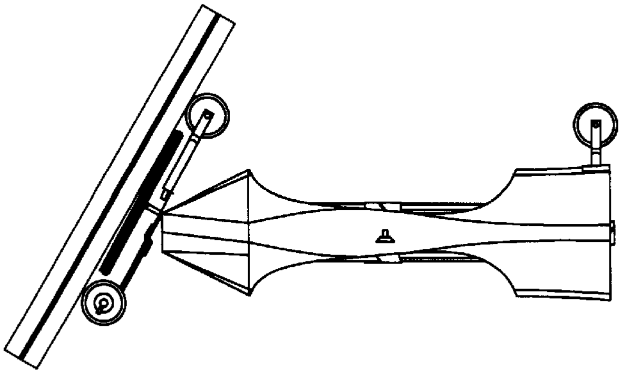
FIG. 3 Flying unit in the sloped work area configuration
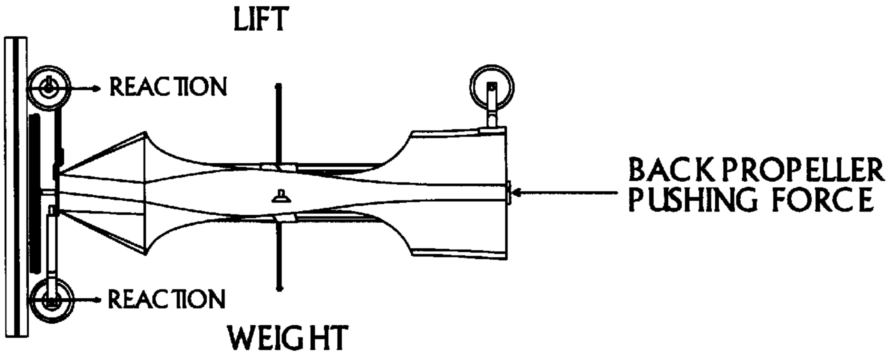
FIG. 4 Main forces applied on the flying unit
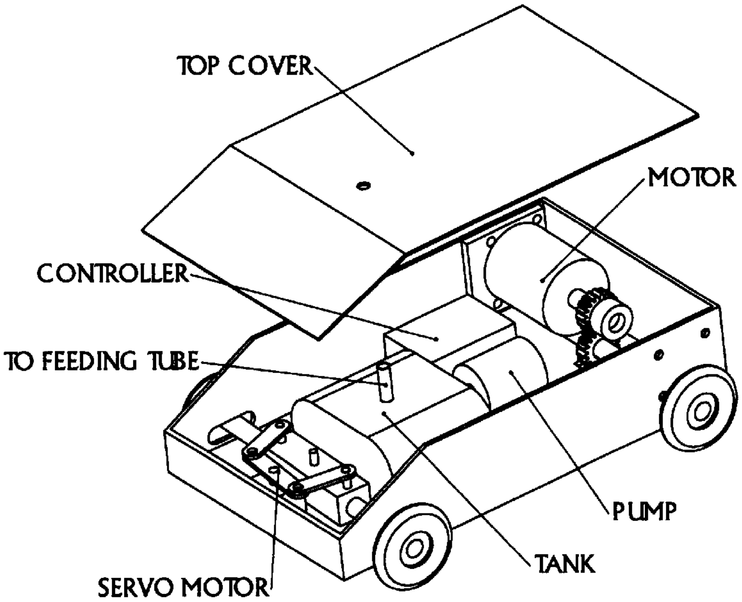
FIG. 5 Ground unit main components

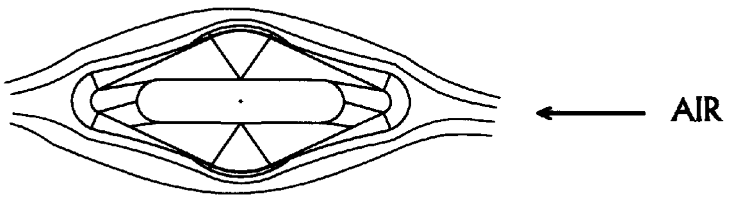
FIG. 6 AIR FLOWING AROUND BODY SHAPE
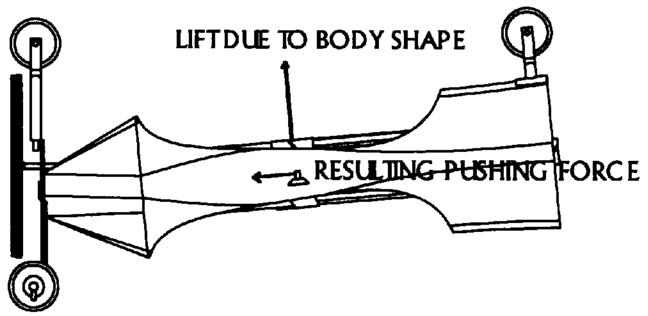
FIG. 7 FORCES RESULTING FROM THE LIFTING BODY SHAPE
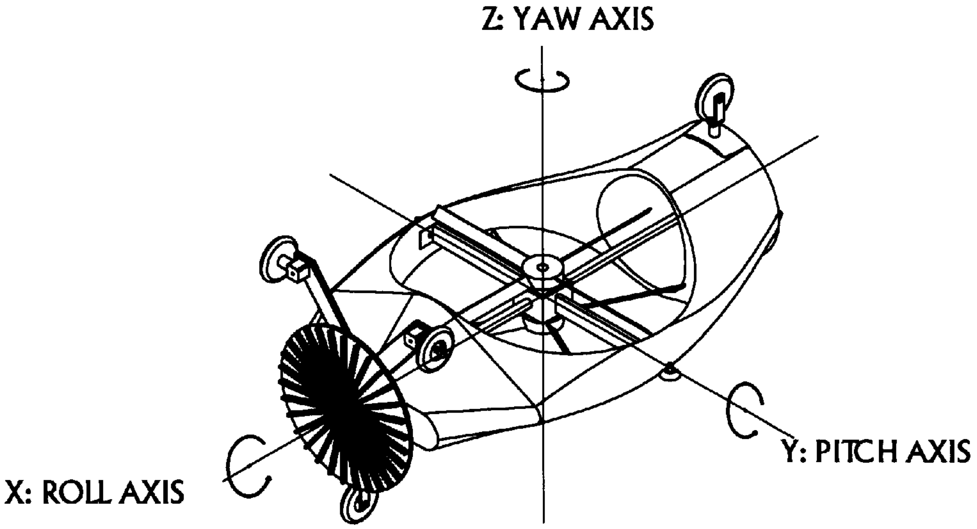
FIG. 8 CONTROL AXIS

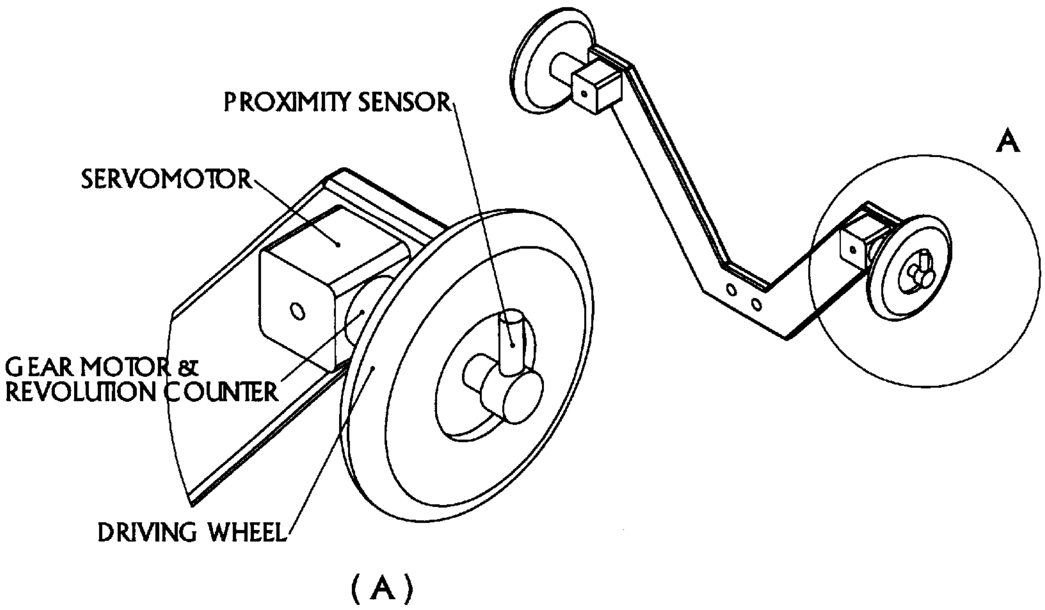
FIG. 9 DETAIL OF THE WHEEL ASSEMBLY
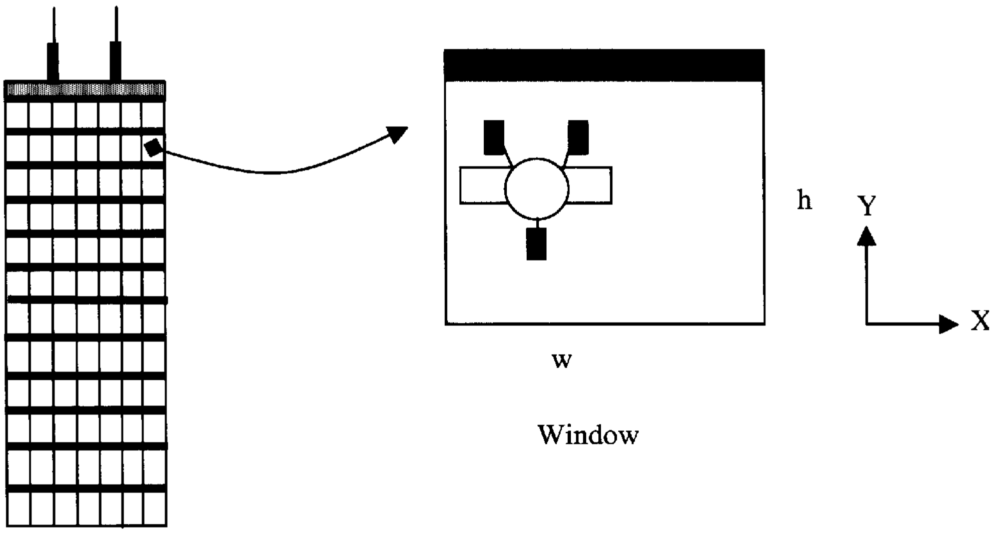
FIG. 10 SCHEMATIC OF THE ROBOT ON A WINDOW

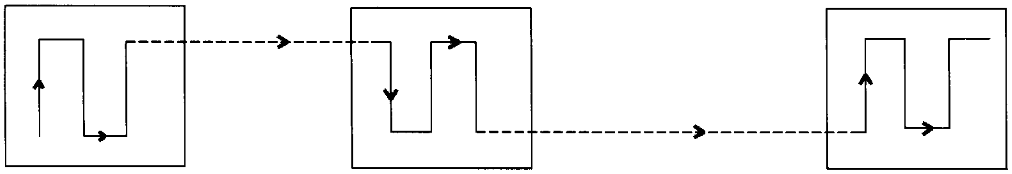
FIG. 11. POSSIBLE ROBOTPATH
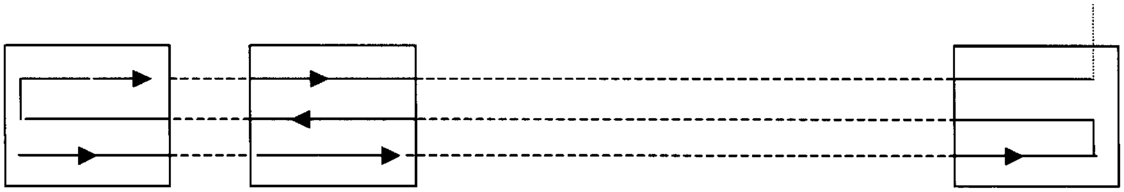
FIG. 12. POSSIBLE ROBOTPATH
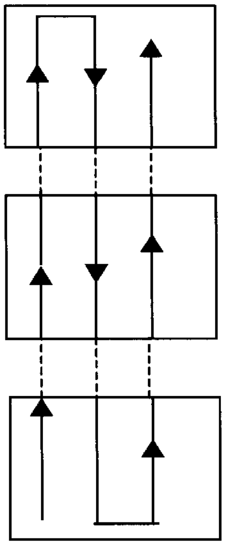
FIG. 13. POSSIBLE ROBOTPATH

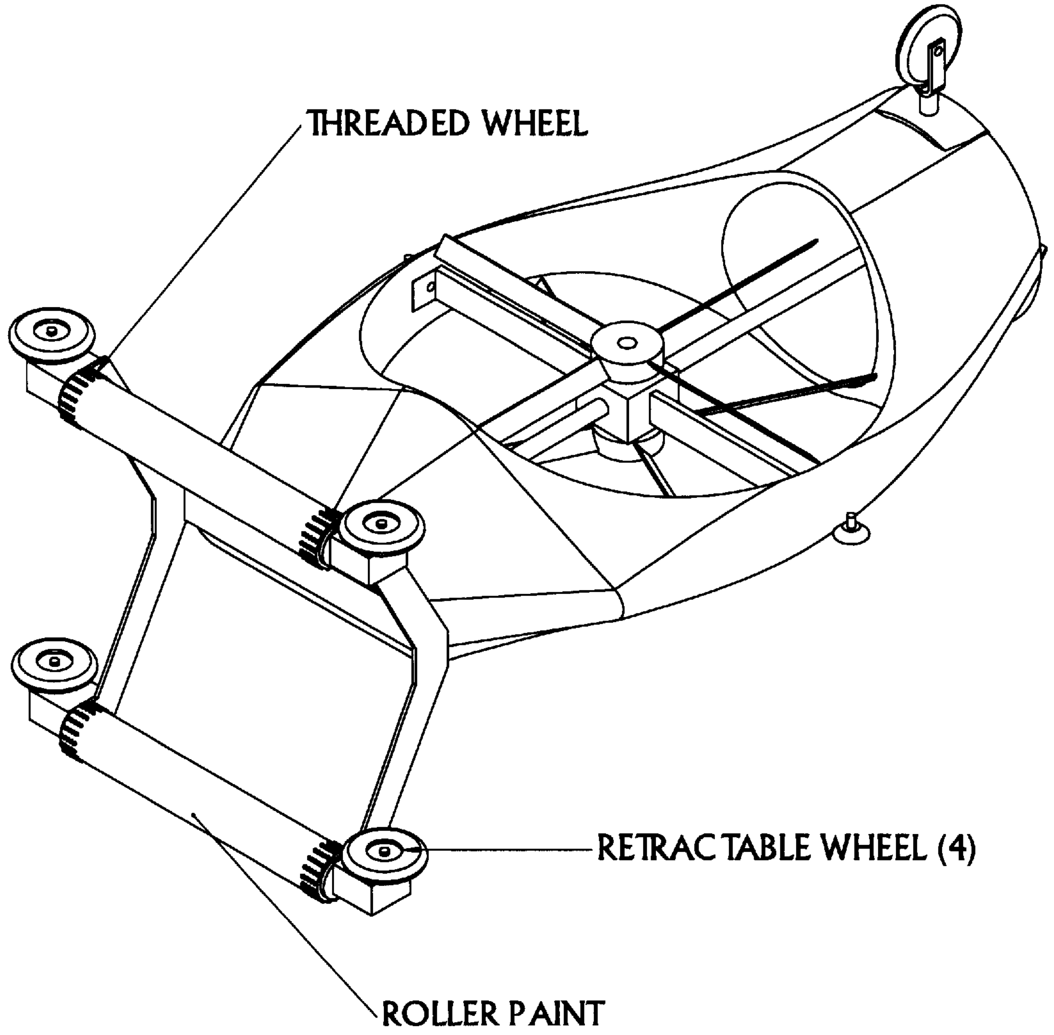
FIG. 14 FLYING UNIT WITH ROLLER PAINT MECHANISM

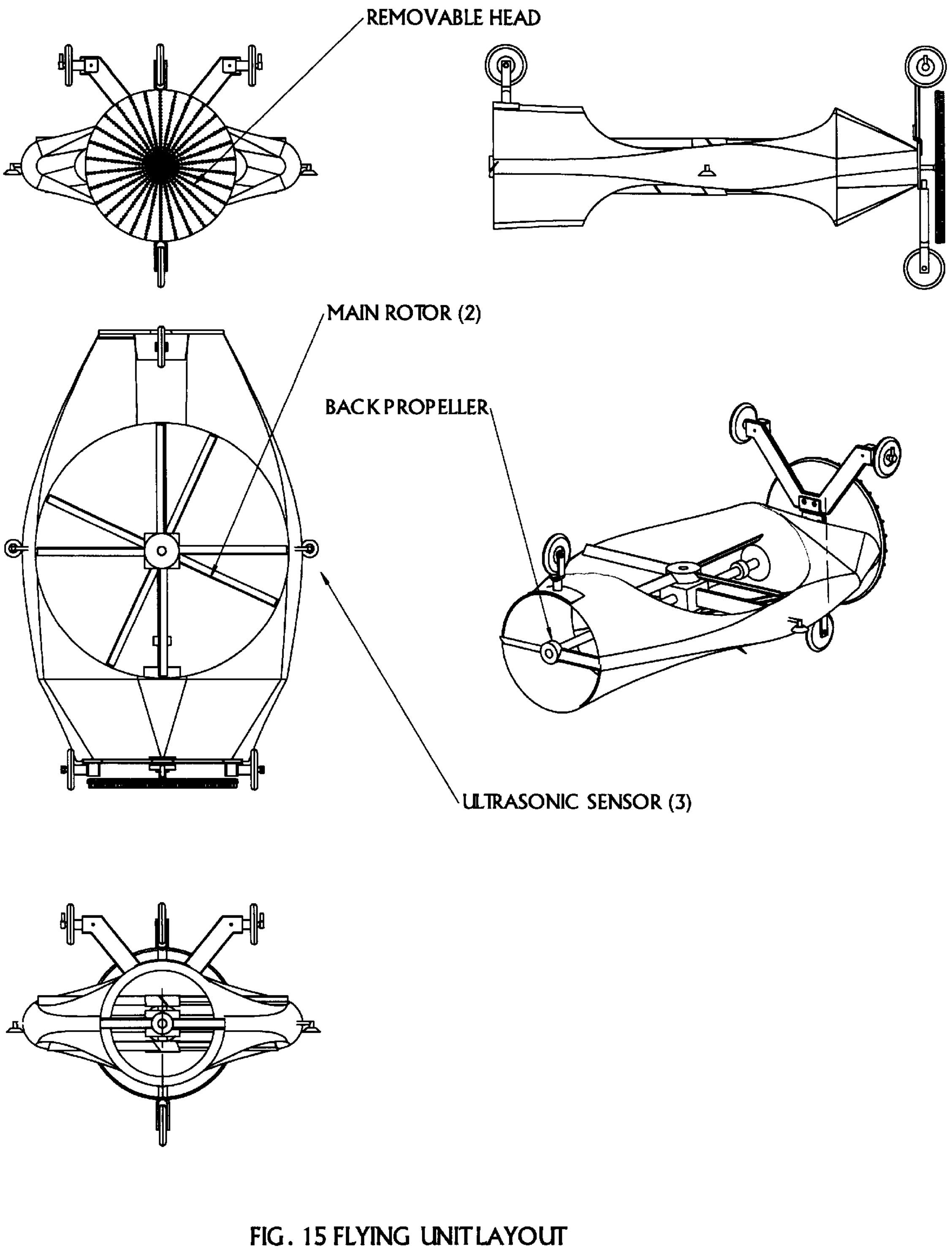
FIG. 15 FLYING UNIT LAYOUT

AIRBORNE CLEANING AND PAINTING ROBOT

BACKGROUND OF THE INVENTION

Conventional cleaning and painting robots are ground based or require a form of restraint to move along side a vertical surface. Most conventional robots use ropes or mechanical arms to keep them in a vertical-working plane. They are limited to the ability to suspend ropes from a high point and/or the length of the mechanical arm. The Airborne Cleaning and Painting Robot does not have the above limitations for its operation, the onboard sensors allow the robot to fly safely at altitude well above the tallest skyscraper. With its wide range of sensors, the robot can move on vertical or horizontal surfaces such as building's windows or high ceilings. It is a well-proven design that was the subject of my Master's thesis, "Conceptual design of a Cleaning Robot", The George Washington University, 1999.

BRIEF SUMMARY OF THE INVENTION

The Airborne Cleaning and Painting Robot is a safe solution for performing dangerous tasks such as cleaning exterior windows of high-rise buildings and high ceilings. The robot can also apply paint on tall walls and high ceilings. The main advantage of the robot over existing design is its ability to fly as high as needed which means it can access most work area to perform its tasks.

The flying part of the robot is feed with pressurized water or paint from a ground-moving base (FIG. 1).

The design of the flying unit is based on helicopter theory. The flying robot has two counter-rotating rotors that provide the necessary thrust for lifting. After the robot has reached the vertical working area, it hovers and the back propeller pushes it against the vertical wall or window. For horizontal work area, the thrust of the main rotors is increased from a hovering state to keep the top wheels on the horizontal surface.

Once the flying unit has reached the vertical work area, the back propeller exerts a force large enough (FIG. 4) to keep it on the vertical surface. The flying unit uses then its front wheels to drive on the surface. In the case where work has to be performed on a ceiling, the fourth wheel is used (FIG. 2) and the cleaning or painting head can be rotated at 90 degrees. For sloped work area, the painting or cleaning mechanism is tilted to accommodate for the slope (FIG. 3). The motion of the flying unit is programmed and controlled from the ground unit.

The ground unit is the "mother vehicle" of the robot assembly. It holds a programmable controller and the cleaning solution or paint. A pump pressurizes the liquid and delivers it to the flying unit from the feeding tube (FIG. 5.).

BRIEF DESCRIPTION OF THE SEVERAL VIEWS OF THE DRAWING

FIG. 1 is showing the general robot configuration;

FIG. 2 is showing the robot in the horizontal work area configuration;

FIG. 3 is showing the robot in the sloped work area configuration;

FIG. 4 is a force diagram showing the main forces applied on the flying unit;

FIG. 5 is an exploded view of the ground unit with the main components;

FIG. 6 Front view of the flying unit body showing air flowing around to create lift;

FIG. 7 Forces create by the flying unit lifting body;

FIG. 8 Isometric view of the flying unit showing the control axis;

FIG. 9 Detail view showing the wheel assembly that drives the flying unit on contact;

FIG. 10 Sketch with axis of the flying unit on a window;

FIG. 11 Possible robot path when the main direction is horizontal;

FIG. 12 Possible robot path when the main direction is horizontal;

FIG. 13 Possible robot path when the main direction is vertical;

FIG. 14 Flying unit with roller paint mechanism showing the threaded wheels;

FIG. 15 Different views of the flying unit;

DETAILED DESCRIPTION OF THE INVENTION

A—The flying unit

The flying unit is propelled by an electric motor that powers two main rotors and a back propeller. A transmission box is used for that purpose. The flying unit has five control actuators for flight stability: main rotors collective pitch for upward and downward motion, cyclic control for lateral motion, tail rotor pitch for backward and forward motion, and engine throttle. A human pilot using a hand held transmitter, which relays pilot control, inputs to an on-board radio receiver can control the robot in the case of emergency. The receiver is connected to the five actuators. For autonomous operation, these pilot control inputs are replaced by on-board computer generated control inputs. A variety of sensors are mounted on the robot; a flux-gate compass for measuring heading, three downward facing ultrasonic sensors (two mounted towards the front of the robot and one mounted near the back propeller) for determining roll, pitch, and altitude of the robot, and a gyroscope for sensing rotation around the vertical axis. A RPM sensor is mounted on one of the coaxial shaft for measuring engine speed, a proximity sensor for avoiding bumps, a revolution counter on one wheel to determine the distance travel, a force sensor mounted on the cleaning and painting mechanism to regulate the pushing force from the back propeller or main rotors and a gray-scale CCD camera to provide visual information. While the robot is working outside on a vertical surface, it might be disturbed by high wind condition; the robot will not perform adequately with such condition. For normal wind condition, if a disturbance occurs such as a transversal gust of wind, the robot's body, which is a lifting body (FIG. 6) will create a sudden lifting force directed upward and toward the vertical surface (FIG. 7). That force will push the robot against the vertical surface and the increase contact resistance will prevent the robot from drifting. All information gather by the sensors is feed into the controller that adjusts and maintains the flying unit stability around the 3 axis (FIG. 8) as follow:

The 3 ultrasonic sensors control the roll and pitch.

The gyroscope controls the yaw

The controller also directs the robot to its programmed path. The wheel assembly drives the flying unit on a surface, just like the wheels of a car do. The wheels are motorized and servomotors are used to change the direction of motion. A revolution counter gets the number of revolutions from the wheel and sends an analog value to the controller (FIG. 9.).

After a preprogrammed number of revolutions corresponding to a given distance, the controller will send a digital output to the servomotor linked to the wheels to change the direction of motion.

The flying unit while on the windows can avoid bumps by detecting them with a proximity sensor (FIG. 9). A signal will be send to the back propeller to change its pitch so that the flying unit can move backward. Changing the pitch of the main rotors will provide more lift to move the robot up to the next floor (next row of windows). The robot is entirely programmed to go from windows to windows. At the same time the flying is constantly adjusting its thrust to overcome the changing weight of the water in the feeding tube. (Note: For a 5 mm inside diameter feeding tube at 600 m—height, the water's weight in the tube is about 11.7 kg).

In the case where the engine speed falls below a safety value, the revolution counter which monitor the engine speed will instruct the controller that the robot has to return to the ground. The pitch of the main rotors can then be adjusted for autorotation.

CASE STUDY: CLEANING OF WINDOWS

The robot is able to move on a vertical surface. After it has traveled a preset distance, it needs to change its direction of travel so that it can cover another area. There are two approaches to the problem. The first one is to use a revolution counter hooked up to one wheel to get the total distance of travel. The data is then sent to the robot controller that will give a signal to the servomotors to turn the wheels when the total distance is reached. The second approach is to use a proximity sensor to detect the end of a working area. The controller will send a signal to the servomotors to change the direction of travel.

Application:

Consider the robot has to clean windows of a building. Most of the time, windows are equally spaced. Given the height and width of a window, the robot can work on one window and move to the next one when the total distance covered on the window is enough to get the job done.

The revolution counter gives the distance-traveled d in the y direction. When d is closed to h, the robot can either move to the right to complete its cleaning job on one window or move up to start a new window at the same x location (FIG. 10).

There are different paths the robot can take to perform the job.

Robot Path 1. (FIG. 11)

Complete one window and move to the right by avoiding possible bumps. The number of turns the robot needs to make on the window can be programmed according to the brush and windows sizes.

When the last window is done, move up to the one just above and clean from left to right.

Repeat all steps until the last floor is done.

Robot Path 2. (FIG. 12)

Do one pass in the x direction at a fixed y location. Repeat passes until job is done on one floor and move up to the next one.

Robot Path 3. (FIG. 13)

Do one pass in the y direction at a fixed x location, which means going from first floor to last floor and then downward until job is done. If the brush is wide enough to cover the entire window width on a single pass, the robot does not need to come back to the same window on its way down.

I just covered the most obvious path the robot can have. From experiments, we need to find out the most efficient path leading to a short operating time.

The cleaning head can have several configurations. The first one can be a simple rotating brush with a sprayer in the center. The periphery of the brush is coated with a sponge like material that collects dirty water and sends it to a small tank for disposal. The disposal system will then spray the water back into the atmosphere or return it to the ground from a second tube. The second type of cleaning head has two rollers one on top of the other. One roller cleans and the other collects dirty water for disposal.

For painting operation the front wheels of the flying unit will be replaced by two motorized rollers paint. Both rollers have threaded wheels at both ends for better wall adhesion to avoid slippage. Four motorized retractable wheels help the flying unit move sideways (FIG. 14).

B—The Ground unit

The ground unit is a four-wheel vehicle that supplies cleaning solution or paint to the flying unit (FIG. 5). It also supplies electric energy to the flying unit from a connecting set of wires. The ground unit holds the controller that works in parallel with the flying unit on-board controller. All the programming is done on the ground unit computer and the instructions are uploaded in real time to the flying unit controller. The ground unit "talks" to the flying unit and knows exactly its position. The ground unit can then follow the flying unit and adjust the tube length and the pressure of the liquid to deliver. The ground unit can be connected to a monitor to receive the images transmit from the flying unit CCD camera.

It will of course be understood that various changes may be made in the robot's shape, onboard sensors, rotors configuration, and arrangement of the various devices of the robot without departing from the scope of the invention which generally stated consists in a robot capable of flying and performing cleaning and/or painting tasks, such as discussed and defined in the appended claims.

What I claim to be my invention is:

1. A flying unit for cleaning and painting tall structures comprising of:

two electric-powered counter-rotating rotors for providing lift, stability and altitude control; one back propeller for providing forward and backward motion and more importantly the pushing force needed to keep the flying unit on a vertical and sloped surface; five control actuators for flight stability: main rotors collective pitch for upward and downward motion, cyclic control for lateral motion, tail rotor pitch for backward and forward motion, and engine throttle; a flux-gate compass for measuring heading; three downward facing ultrasonic sensors (two mounted towards the front of the flying unit and one mounted below the back propeller) for determining roll, pitch, and altitude of the flying unit; a gyroscope for sensing rotation around the vertical axis; an interchangeable cleaning or painting apparatus; two proximity sensors mounted on the cleaning and painting apparatus for avoiding obstacles and keeping the flying unit at preprogrammed distance from surfaces; a revolution counter mounted on the cleaning and painting apparatus for measuring distance traveled on contact surface; a programmable controller that receives the inputs from the sensors and guide and control the flying unit.

2. A flying unit as defined in claim 1 and having the capability to be self-controlled to clean or paint surfaces via the robot controller in which the surfaces characteristics are known such as windows sizes and distance between windows in all directions.

3. A flying unit as defined in claim 1, which is connected to a four-wheel ground unit vehicle that supplies pressurized cleaning solution or paint via a feeding tube and electric energy to the flying unit.

4. The ground unit of claim 3 having the capability to adjust the delivery pressure of the cleaning solution and paint from the altitude of the flying unit via its controller that works in parallel with the flying unit on-board controller.

5. The ground unit of claim 3 having the capability to adjust via its controller that works in parallel with the flying unit on-board controller the feeding tube length that is tied to a rotating barrel from the altitude of the flying unit.

6. A flying unit as defined in claim 1 and having the capability to paint stripes in different colors in which the painting apparatus will be composed of concentric roller paints, a paint delivery system that mixes the primary color supply by the feeding tube from the ground unit with dyes kept in separate containers, the mixed paint is delivered individually to each roller paint.

* * * * *